(12) United States Patent
Vetter et al.

(10) Patent No.: US 7,829,038 B2
(45) Date of Patent: Nov. 9, 2010

(54) SEGMENTED OUTER CATALYST RETENTION SCREEN FOR STACKED RADIAL FLOW REACTORS

(75) Inventors: Michael J. Vetter, Schaumburg, IL (US); Jeffrey E. Burgard, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 462 days.

(21) Appl. No.: 11/926,579

(22) Filed: Oct. 29, 2007

(65) Prior Publication Data

US 2009/0110615 A1 Apr. 30, 2009

(51) Int. Cl.
*B01J 8/08* (2006.01)

(52) U.S. Cl. .................. 422/211; 422/218; 422/219; 422/220

(58) Field of Classification Search .......... 422/211, 422/218, 219, 220, 222
See application file for complete search history.

(56) References Cited

U.S. PATENT DOCUMENTS

| | | | |
|---|---|---|---|
| 4,478,793 A | 10/1984 | Vickers | 422/216 |
| 5,366,704 A | 11/1994 | Koves et al. | 422/218 |
| 5,405,586 A * | 4/1995 | Koves | 422/218 |
| 6,221,320 B1 * | 4/2001 | Nagaoka | 422/218 |
| 6,224,838 B1 | 5/2001 | Schulz et al. | 422/218 |
| 7,163,666 B2 * | 1/2007 | Barnes | 422/311 |
| 7,226,568 B1 * | 6/2007 | Ham et al. | 422/218 |
| 7,438,191 B2 * | 10/2008 | Koves | 209/392 |
| 7,622,089 B1 * | 11/2009 | Glover | 422/220 |
| 2008/0107575 A1 * | 5/2008 | Vetter et al. | 422/211 |
| 2009/0111898 A1 * | 4/2009 | Brunard et al. | 518/700 |
| 2009/0142240 A1 * | 6/2009 | Vetter et al. | 422/211 |
| 2009/0238729 A1 * | 9/2009 | Glover | 422/139 |

* cited by examiner

*Primary Examiner*—N. Bhat
(74) *Attorney, Agent, or Firm*—Mark Goldberg

(57) ABSTRACT

A radial flow reactor design is presented. The reactor has individual and interchangeable screens that are arrayed circumferentially around the inside of the reactor. The reactor includes a plurality of screens held out from the reactor wall to form a circumferential screen, with channels defined between the reactor wall and the circumferential screen.

18 Claims, 2 Drawing Sheets

SEGMENTED OUTER CATALYST RETENTION SCREEN FOR STACKED RADIAL FLOW REACTORS

BACKGROUND OF THE INVENTION

The invention relates to the internals for a radial flow reactor. A radial flow reactor includes devices for retaining catalyst or adsorbent in a frustoconical space within a reactor, and devices for the inlet and outlet flow of fluid across the catalyst or adsorbent.

A wide variety of processes use radial flow reactors to provide for contact between a fluid and a solid. The solid usually comprises a catalytic material on which the fluid reacts to form a product, or an adsorbent for selectively removing a component from the fluid. The processes cover a range of processes, including hydrocarbon conversion, gas treatment, and adsorption for separation.

Radial flow reactors are constructed such that the reactor has an annular structure and that there are annular distribution and collection devices. The devices for distribution and collection incorporate some type of screened surface. The screened surface is for holding catalyst or adsorbent beds in place and for aiding in the distribution of pressure over the surface of the reactor, or adsorber, and to facilitate radial flow through the reactor bed. The screen can be a mesh, either wire or other material, or a punched plate. For a moving bed, the screen or mesh provides a barrier to prevent the loss of solid catalyst particles while allowing fluid to flow through the bed. The screen requires that the holes for allowing fluid through are sufficiently small to prevent the solid from flowing across the screen. Solid catalyst particles are added at the top, and flow through the apparatus and removed at the bottom, while passing through a screened-in enclosure that permits the flow of fluid over the catalyst. The screen is preferably constructed of a non-reactive material, but in reality the screen often undergoes some reaction through corrosion, and over time problems arise from the corroded screen or mesh.

The screens or meshes used to hold the catalyst particles within a bed are sized to have apertures sufficiently small that the particles cannot pass through. The outer screen element can be provided by a cylindrical screen that retains particles in its interior, and provides for the distribution of fluid through the space between the screen and the outer wall of the reactor. Another design for an outer screen element is to use a plurality of oblong conduits arrayed around the wall of the reactor. A common shape for the oblong conduits is a scallop shaped cross-section where the flattened side is positioned against the wall of the reactor and the more sharply curved side presents a screened face that allows the catalyst to flow against, while fluid flows within the oblong conduit and passes through the screened face. The flattened side is shaped to substantially conform with the curve of the reactor wall to minimize volume between the conduits and the reactor wall.

The common type scallop design can be found in U.S. Pat. Nos. 5,366,704 and 6,224,838, where the scallops have either punched plates or longitudinally extended profile wire arrangements, respectively.

The scallop design provides some improvements in convenience for placing the screen elements in the reactor, but the scallop designs also include the drawback of creating tight spaces where catalyst can lodge and get stuck. The scallop design also presents regions of uneven flow for the fluid entering the region holding the catalyst and therefore provide for poorer utilization of the catalyst within the reactor.

BRIEF SUMMARY OF THE INVENTION

A new design for a radial flow reactor is presented. The reactor comprises a cylindrical housing. Within the housing, and arrayed circumferentially around the inner wall, a plurality of supports are affixed to the housing. The supports are arrayed equidistant around the circumference and extend longitudinally along the reactor wall. The supports project perpendicularly from the wall and have a flange plate affixed to the edge opposite the reactor wall. The reactor further includes a plurality of screens, where each screen is affixed to a pair of neighboring supports. The supports, screens and reactor wall define fluid flow channels arrayed circumferentially around the inside of the reactor housing. The reactor further includes a perforated central conduit disposed in the center of the housing, wherein the space between the central conduit and the plurality of screens defines the reactor bed space where solid catalyst particles reside.

Other objects, advantages and applications of the present invention will become apparent to those skilled in the art from the following detailed description and drawings.

DETAILED DESCRIPTION OF THE INVENTION

Figure 1:
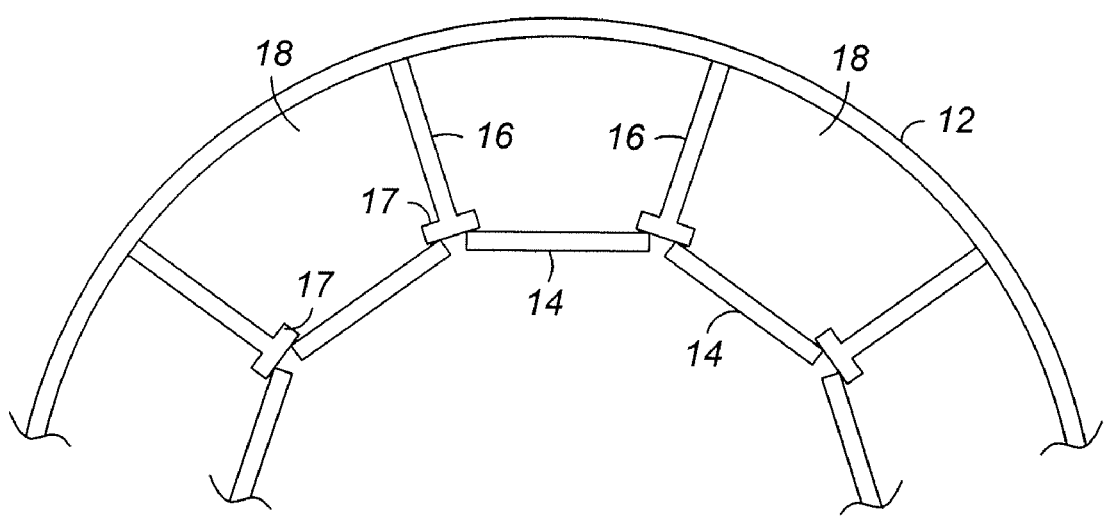
FIG. 1 is a section of a horizontal cross-section of a reactor showing the screens and supports.

The present invention is applicable to any radial flow system for fluid-solid contacting, but in particular for radial flow reactors. Radial flow reactors are often corrosive environments, and it is desirable to have reactor components, or reactor internals, that are easily replaced. It is also desirable to improve the interface between the reactor internals and catalyst that can reside as a fixed bed, or flow through in a moving reactor bed. As hereinafter used, the term reactor shall be deemed to mean any fluid-solid contacting apparatus, and catalyst bed to mean any bed of solid particulate matter, whether a catalyst or adsorbent.

The present invention provides a radial flow reactor having interchangeable and individually replaceable reactor screen panels that are arrayed circumferentially around the inside of the reactor. The reactor comprises a substantially cylindrical housing having a vertical orientation, where the housing provides the wall to the reactor, and where the housing has a fluid inlet and a fluid outlet. In the reactor housing, there are a plurality of supports where each support is affixed to the reactor wall in a longitudinal manner. The supports are arrayed equidistant around the inside of the reactor. The reactor further includes a plurality of screens where each screen is detachably affixed to a pair of neighboring supports. The screens, when affixed to the supports, define fluid channels where each channel has the screen on an interior face of the channel, the reactor wall on an exterior face of the channel, and the supports on the sides of the channel. In the center of the reactor is a perforated conduit. In the reactor, a particle retention space is defined by the volume between the central conduit and the screens. The central conduit is in fluid communication with either the fluid inlet or the fluid outlet, and the fluid channels defined by the screens are in fluid communication with the other of the fluid inlet or fluid outlet. The existing perforated plate scallops are a weak internal mechanical component partly by the nature of their design being very open and as a result relatively thin. The discrete screen panel design will enable us to design considerably more mechanical strength into the system to address catalyst bed dynamics and resulting pressures.

The screens can comprise either perforated plates, profile wire screens or plates having a plurality of apertures with louvers overhanging the apertures. The central conduit can comprise either a perforated plate, profile wire screen or a plate having a plurality of apertures with louvers overhanging the apertures, and rolled to form the conduit. In the present invention, it is envisioned that the screens are substantially planar, however, screens having a curvature to conform with the curvature of the reactor are also considered to fall within the scope of the design for the screens in the reactor. While the number of screens arrayed circumferentially around the inside of the reactor can be any number greater than 3, the size of the screens can depend on the reactor housing design, and it is preferred that the screens are sized to fit through normal maintenance access ports in the reactor housing, therefore the preferred number of screens arrayed circumferentially around the inside of the reactor is between 12 and 32, inclusive.

FIG. 1 shows a portion of a horizontal cross-section of a reactor. The reactor includes the housing 12, screens 14, and supports 16. Channels 18 are defined by the spaces created by the surrounding screen 14, housing 12, and supports 16. Preferably, the supports 16 can be a continuous beam extending longitudinally along the housing 12 and oriented substantially perpendicularly to the housing 12 wall. The longitudinally oriented supports 16 can be solid, or have openings in the supports 16 to allow for some fluid flow and equalization of pressure circumferentially around the channels 18. The supports 16 include a flange plate 17 affixed to an edge of the supports 16 that is distal from the edge of the support 16 affixed to the reactor wall. The flange plate 17 provides a means to releaseably attach a screen 14 to the support 16. The beam can be designed to have openings to allow for flow between channels 18, or the supports 16 can comprise a plurality of sub-supports that are aligned vertically and with each sub-support having a first end affixed to the housing wall. Each sub-support projects into the reactor, and has a second end wherein the screens 14 are affixed. When the supports 16 comprise a plurality of sub-supports, each support 16 further includes a continuous beam that is affixed to the second ends of the sub-supports, and provides a point of attachment for affixing the screens 14.

Figure 2:
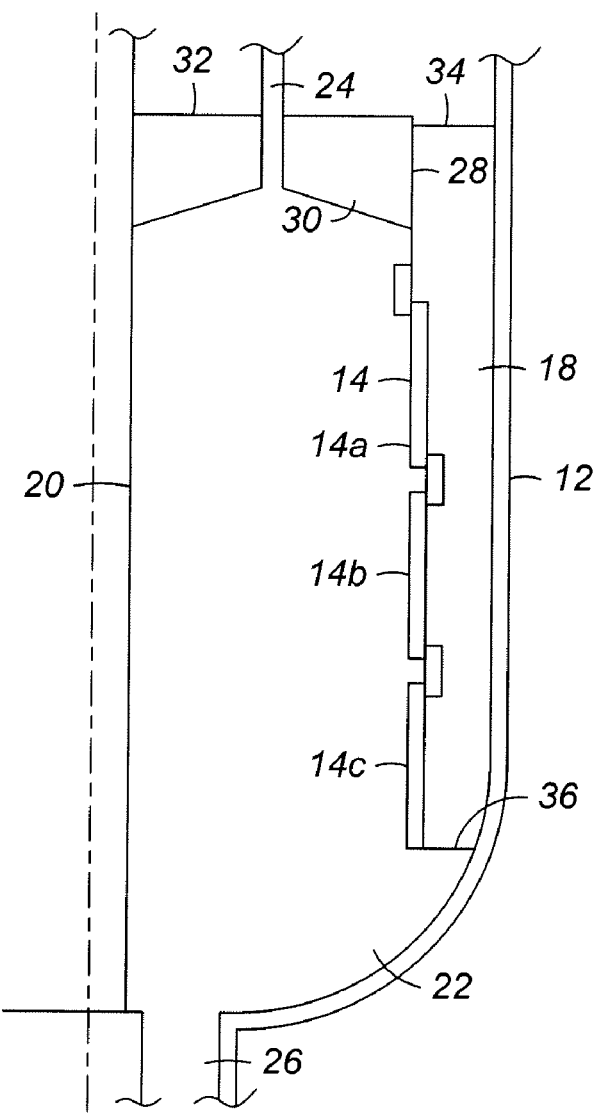
FIG. 2 is a vertical cross-section of the reactor.

For the same embodiment, FIG. 2 shows a portion of a vertical cross-section of the reactor. The reactor shows a portion of the housing 12, with a section of the conduits 18 formed by the screens 14, the perforated center conduit 20, and the particle retention space 22 formed between the center conduit 20 and the screens 14.

In the reactor, solid catalyst particles are admitted through a catalyst inlet port 24, flow down through the particle retention space 22, and flow out through the catalyst outlet port 26. A gas to be reacted in the bed flows into the channels 18, across the catalyst bed in the particle retention space 22, and out the perforated center conduit 20. At the upper end of the reactor, there is a space above the screens 14, and to prevent catalyst from flowing into the channels 18, the reactor includes sealing shrouds 28 extending from the top of the screens 14 to above the lower end of the catalyst inlet port 24. As a result the shrouds 28 will extend above the surface of the catalyst 30.

Figure 3:
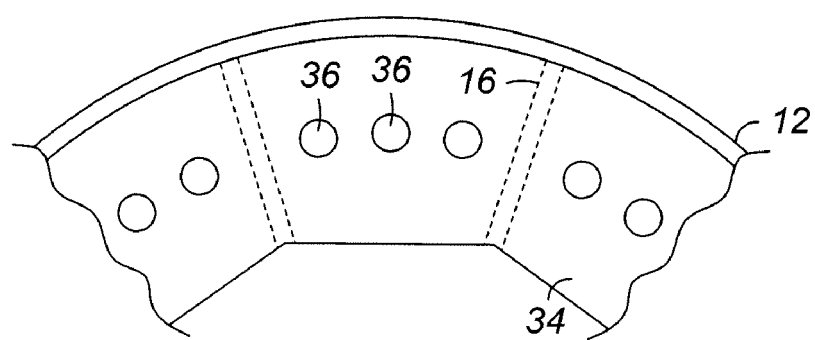
FIG. 3 is a section of the cover plate for distributing fluid into the channels circumferentially surrounding the reactor bed.

In one embodiment, the reactor includes a panel, or plate, 32 through which the catalyst inlet port 24 extends, and covers the particle retention space 22 from the top of the shrouds 28. The plate 32 provides for directing inlet gas flows from above the plate 32 to the channels 18 around the circumference of the reactor. The plate 32 also provides a barrier to prevent catalyst in the particle retention space 22 from overflowing into the channels 18. To improve distribution of flow into the channels 18, the reactor includes a cover plate 34 that is affixed to the top of the shrouds 28 and covers the space between the shrouds 28 and the reactor wall 12. The cover plate 34 has apertures defined therein for the flow of gas, or fluid, from the upper space in the reactor down into the channels 18. One possible design for the cover plate 34 is shown in FIG. 3. The cover plate 34 has apertures 36 defined therein and provides for a slight pressure drop. The pressure drop across the cover plate 34 allows for a good distribution of gas into the channels 18.

In one embodiment, the screens 14 do not extend to the bottom of the reactor, but instead have an opening 36 that allows some gas to flow and contact the catalyst. Primarily, the design having an opening 36 allows for catalyst fines that can pass through the screens 14 to flow down the channels 18 and to be collected with the catalyst particles and to exit the reactor with the catalyst particles. The fines can be separated from the catalyst during regeneration of the catalyst.

In another embodiment, the screens 14 comprise a plurality of screen sections 14a, 14b, 14c that are positioned in a vertical orientation. This provides for constructing a tall reactor without requiring long and narrow screens 14. The screen sections 14a, 14b, 14c are affixed to the supports 16 with the same means to detachably affix single screens 14. The screen sections 14a, 14b, 14c further include narrow solid panels to prevent gaps between the screen sections 14a, 14b, 14c. This prevents the flow of catalyst into the channels 18. The typical reactor will be between 6 m (20 feet) and 15 m (50 feet) tall, and it is preferred to have each screen comprise a plurality of screen sections, wherein each section is approximately 2 m (6.5 feet) long. The preferred number of screen sections for each screen is from 4 to 24. This provides for easier maintenance, and instead of requiring long scallops or other large screen items, a few interchangeable screen sections 14a, 14b, 14c can be stored conveniently on site to reduce downtime.

The present design overcomes shortfalls due to the current scallop design. The present design removes the cusp of space between the scallops and provides for better flow distribution over the surface of the screen. In addition, the design allows for shorter screen sections that can be individually affixed in place and does not require the screens to extend the entire longitudinal length of the reactor bed.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A radial flow reactor comprising:
   a vertically oriented substantially cylindrical housing for the reactor, where the housing provides the wall to the reactor, and having a fluid inlet and a fluid outlet;
   a plurality of supports, where each support is affixed to wall of the reactor and projects substantially perpendicularly from the wall into the reactor, and oriented in a longitudinal manner along the reactor wall;

a plurality of screens where each screen is detachably affixed between a pair of supports, and where a plurality of fluid flow channels are each defined by the volume surrounded by the screen, the housing wall and the supports; and a perforated central conduit disposed in the center of the housing and in fluid communication with either the fluid inlet or the fluid outlet;

where a particle retention space is defined by the volume between the central conduit and the plurality of screens.

2. The reactor of claim 1 wherein the screens are perforated plates.

3. The reactor of claim 1 wherein the screens are profile wire screens.

4. The reactor of claim 1 wherein the screens comprise plates having apertures and louvers overhanging the apertures.

5. The reactor of claim 1 wherein the perforated central conduit is a perforated plate.

6. The reactor of claim 1 wherein the perforated central conduit has a profile wire arrangement.

7. The reactor of claim 1 wherein the supports are continuous vertical supports where each support has a first edge affixed to the reactor wall and a second edge distal to the first edge and each support has a flange plate affixed to the second edge in a substantially perpendicular orientation.

8. The reactor of claim 1 wherein each of the supports comprise;

a plurality of sub-supports aligned vertically with each sub-support having a first end affixed to the housing wall, the sub-support projecting into the reactor, and terminating at a second end, and a continuous beam oriented along the sub-supports and affixed to the second ends of each sub-support.

9. The reactor of claim 1 wherein each screen is substantially planar.

10. The reactor of claim 1 wherein the number of screens arrayed circumferentially is between 12 and 32.

11. The reactor of claim 1 wherein the housing has a maintenance hatch, and where the screens are sized sufficiently small to fit through the maintenance hatch.

12. The reactor of claim 1 further comprising a plurality of sealing shrouds where each shroud extends from the top of a screen to above the surface of the catalyst.

13. The reactor of claim 12 further comprising at least one cover plate that is detachably affixed to the top of the sealing shrouds.

14. The reactor of claim 1 wherein the screens do not extend to the bottom of the reactor housing, and the fluid flow channels defined by the volume surrounded by the screen, the housing wall and the supports have an open bottom.

15. The reactor of claim 1 wherein each screen comprises a plurality of sections, where the sections for each screen are vertically stacked and detachably affixed between a pair of supports.

16. The reactor of claim 1 further comprising at least one cover plate that is detachably affixed to the top of the screens, and where the cover plate has apertures defined therein for the distribution of fluid to the channels defined by the screens.

17. The reactor of claim 1 further comprising at least one cover plate that is detachably affixed to the top of the screens.

18. A radial flow reactor comprising:

a vertically oriented substantially cylindrical housing for the reactor, where the housing provides the wall to the reactor, and having a fluid inlet and a fluid outlet;

a plurality of supports, where each support is affixed to the wall of the reactor and projects substantially perpendicularly from the wall into the reactor, and oriented in a longitudinal manner along the reactor wall;

a plurality of screens where each screen comprises a plurality of screen sections positioned in a vertical orientation, and each screen section is detachably affixed between a pair of supports, and where a plurality of fluid flow channels are each defined by the volume surrounded by the screen, the housing wall and the supports; and a perforated central conduit disposed in the center of the housing and in fluid communication with either the fluid inlet or the fluid outlet;

where a particle retention space is defined by the volume between the central conduit and the plurality of screens.

* * * * *